(12) United States Patent
Mayuzumi (10) Patent No.: US 11,601,433 B2
(45) Date of Patent: Mar. 7, 2023

(54) COMMUNICATION DEVICE, COMMUNICATION METHOD, AND COMMUNICATION SYSTEM

(71) Applicant: Ryusuke Mayuzumi, Kanagawa (JP)

(72) Inventor: Ryusuke Mayuzumi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 171 days.

(21) Appl. No.: 17/010,031

(22) Filed: Sep. 2, 2020

(65) Prior Publication Data

US 2020/0403999 A1 Dec. 24, 2020

Related U.S. Application Data

(63) Continuation of application No. 15/918,041, filed on Mar. 12, 2018, now abandoned.

(30) Foreign Application Priority Data

Mar. 28, 2017 (JP) .............................. JP2017-063268

(51) Int. Cl.
*G06F 21/00* (2013.01)
*H04L 9/40* (2022.01)
(Continued)

(52) U.S. Cl.
CPC .......... *H04L 63/101* (2013.01); *G06F 3/1222* (2013.01); *G06F 3/1231* (2013.01);
(Continued)

(58) Field of Classification Search
CPC . H04L 63/101; H04L 41/0213; G06F 3/1222; G06F 3/1231; G06F 3/1236; G06F 3/1285; G06F 3/1286
See application file for complete search history.

(56) References Cited

U.S. PATENT DOCUMENTS

2002/0145748 A1* 10/2002 Nonoyama ............ G06K 15/00
 358/1.14
2010/0192216 A1* 7/2010 Komatsu ............ H04L 63/0209
 726/12

(Continued)

FOREIGN PATENT DOCUMENTS

JP 2005-229332 8/2005
JP 2013-054514 3/2013

*Primary Examiner* — Ghazal B Shehni
(74) *Attorney, Agent, or Firm* — IPUSA, PLLC (57) ABSTRACT

A communication device is connected to first and second networks. The communication device includes a processor executing a process including relaying communication between the first and second networks; and confirming connection to a first device connected to the first network or a second device connected to the second network, based on a device list registered in advance. The confirming includes blocking the relaying when the confirmation of the connection to the first device is unsuccessful; enabling the relaying when the confirmation of the connection to the first device is successful and when the second device is not registered in the device list; enabling the relaying when the confirmation of the connections to the first and second devices is successful; and blocking the relaying when the confirmation of the connection to the first device is successful and when the confirmation of the connection to the second device is unsuccessful.

10 Claims, 5 Drawing Sheets

(51) Int. Cl.
*H04L 41/0213* (2022.01)
*G06F 3/12* (2006.01)

(52) U.S. Cl.
CPC .......... *G06F 3/1236* (2013.01); *G06F 3/1285* (2013.01); *G06F 3/1286* (2013.01); *H04L 41/0213* (2013.01)

(56) References Cited

U.S. PATENT DOCUMENTS

| | | | | |
|---|---|---|---|---|
| 2012/0069371 | A1* | 3/2012 | Fujii | G06F 3/1238 358/1.13 |
| 2015/0347118 | A1* | 12/2015 | Yeung | G06F 8/65 717/172 |
| 2016/0072925 | A1* | 3/2016 | Yamada | H04L 12/2809 709/217 |
| 2016/0210827 | A1 | 7/2016 | Fu et al. | |

* cited by examiner

COMMUNICATION DEVICE, COMMUNICATION METHOD, AND COMMUNICATION SYSTEM

CROSS-REFERENCE TO RELATED APPLICATION

The present application is a continuation application of U.S. patent application Ser. No. 15/918,041, and is based on and claims priority to Japanese Patent Application No. 2017-063268, filed on Mar. 28, 2017, the entire contents of which are hereby incorporated herein by reference.

BACKGROUND OF THE INVENTION

1. Field of the Invention

The present invention relates to a communication device, a communication method, and a communication system.

2. Description of the Related Art

In government offices or hospitals, there are cases where a plurality of networks are used, including a network handling information to be kept confidential such as personal information, and a network requiring less confidentiality than the aforementioned network. Also, in a general company, even when a plurality of departments share the same floor, the networks used by the respective departments may be different. When a plurality of networks are operated, and a multifunction peripheral or a printer is installed for each network, the management cost increases and the occupied area increases. Thus, it is required to consolidate the number of multifunction peripherals or printers. However, when one multifunction peripheral or one printer processes packets from a plurality of networks, in the rout control by Transmission Control Protocol/Internet Protocol (TCP/IP), problems in security may occur, such as erroneous transmission and leakage of packets to other networks (for example, communication from a terminal having the same Internet Protocol (IP) address that is disguised, etc.), etc. There is already known a configuration of providing an image processing apparatus capable of automatically enabling communication, when it is necessary to perform communication between the image processing apparatus and another device, even when the network interface of the image processing apparatus belongs to a particular network address, and the other device that is a communication partner of the image processing apparatus belongs to a network address different from the particular network address (for example, Patent Document 1).

Patent Document 1: Japanese Unexamined Patent Application Publication No. 2005-229332

SUMMARY OF THE INVENTION

An aspect of the present invention provides a communication device, a communication method, and a communication system, in which one or more of the disadvantages of the related art are reduced.

According to one aspect of the present invention, there is provided a communication device connected to a first network and a second network, the communication device including a processor, in communication with a memory, executing a process including relaying communication between the first network and the second network via a network interface included in the communication device; and confirming connection to a first device connected to the first network or a second device connected to the second network, based on a device list stored in advance in a storage device included in the communication device, the connection to the first device or the second device being made via a port included in the communication device, wherein the confirming includes blocking the relaying upon determining that the confirmation of the connection to the first device connected to the first network is unsuccessful based on the device list; enabling the relaying upon determining that the confirmation of the connection to the first device connected to the first network is successful based on the device list and upon determining that the second device connected to the second network is not registered in the device list; enabling the relaying upon determining that the confirmation of the connection to the first device connected to the first network is successful based on the device list and upon determining that the confirmation of the connection to the second device connected to the second network is successful based on the device list; and blocking the relaying upon determining that the confirmation of the connection to the first device connected to the first network is successful based on the device list and upon determining that the confirmation of the connection to the second device connected to the second network is unsuccessful based on the device list.

DETAILED DESCRIPTION OF THE PREFERRED EMBODIMENTS

The network device of the related art can separate a plurality of networks that are not permitted to communicate with each other. On the other hand, a particular network (a network to which a multifunction peripheral, etc., which is desired to be commonly used, is connected) can communicate with each of the plurality of networks that are not permitted to communicate with each other. Therefore, there has been a problem that when a Local Area Network (LAN) cable is physically inserted by mistake, communicate will be enabled between the networks that are not supposed to be permitted to communicate with each other.

A problem to be solved by an embodiment of the present invention is to prevent communication in a combination of networks for which communication is not permitted, when a plurality of networks are separated.

Embodiments of the present invention will be described by referring to the accompanying drawings.

Figure 1:
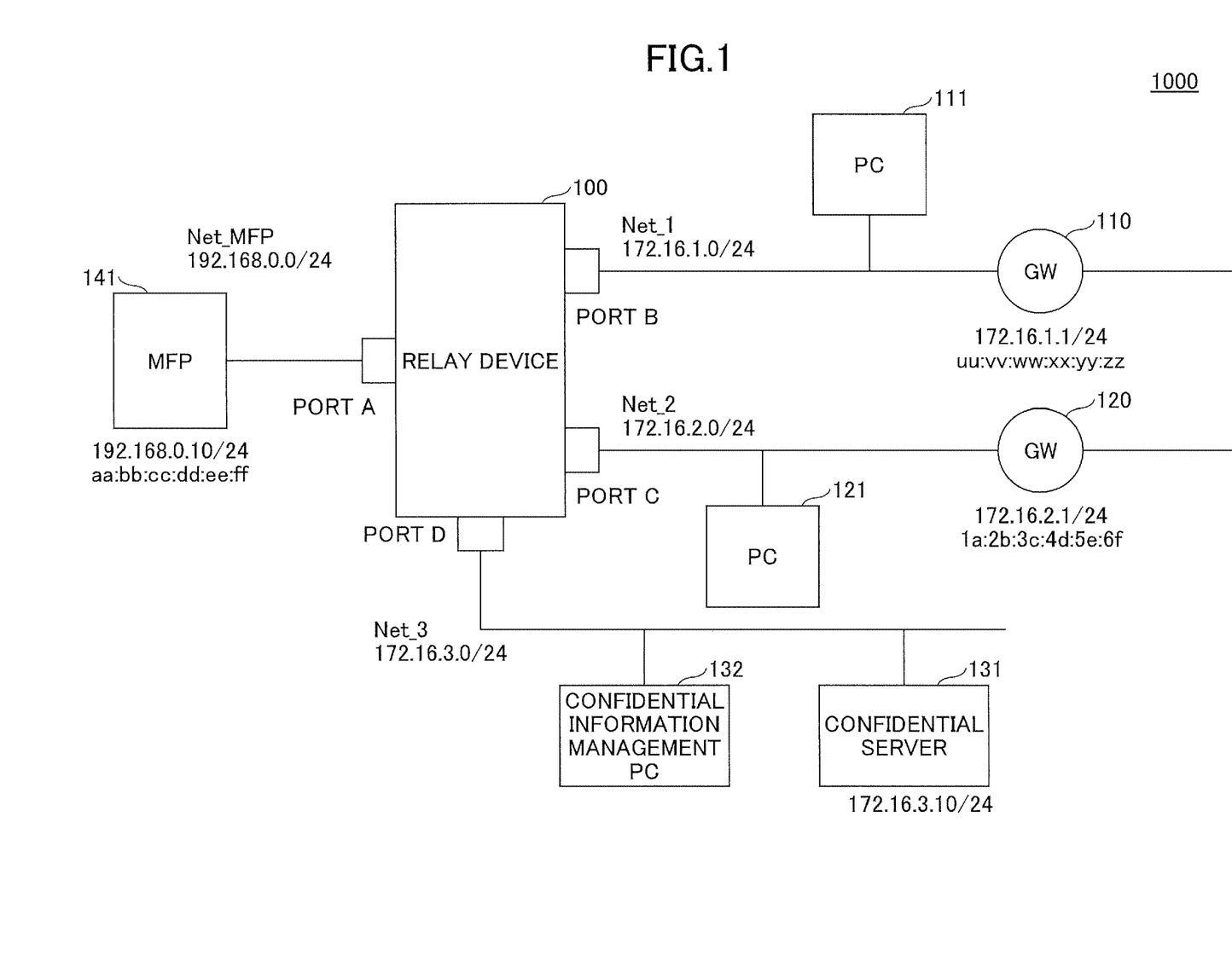
FIG. 1 is a diagram illustrating a configuration example of a communication system according to an embodiment of the present invention.

FIG. 1 is a diagram illustrating a configuration example of a communication system 1000 according to an embodiment of the present invention. As illustrated in FIG. 1, the communication system 1000 includes a relay device 100, a gateway (GW) 110, a personal computer (PC) 111, a GW 120, a PC 121, a confidential server 131, a confidential information management PC 132, and a multifunction peripheral (MFP) 141.

The relay device 100 includes a plurality of physical Local Area Network (LAN) ports and relays communication between a plurality of networks. The plurality of networks may have different network addresses or may have the same network address. In the configuration example illustrated in FIG. 1, a port A of the relay device 100 is connected to a network Net_MFP, and the network address of Net_MFP is set as 192.168.0.0/24. Similarly, a port B of the relay device 100 is connected to a network Net_1, and the network address of Net_1 is set as 172.16.1.0/24. Similarly, a port C of the relay device 100 is connected to a network Net_2, and the network address of Net_2 is set as 172.16.2.0/24. Similarly, a port D of the relay device 100 is connected to a network Net_3, and the network address of Net_3 is set as 172.16.3.0/24. The relay device 100 does not relay the communication between the networks connected to the port B, the port C, and the port D, but relays the communication between each of the networks connected to the port B, the port C, and the port D and the network connected to the port A.

The GW 110 and the GW 120 are gateways. For example, when a device transmits a packet to an Internet Protocol (IP) address other than the network address to which the device belongs, the gateway receives the packet from the device and transmits the received packet to another network. The GW 110 is connected to Net_1 and has an IP address of 172.16.1.1 and a Media Access Control (MAC) address of uu:vv:ww:xx:yy:zz. The GW 120 is connected to Net_2, and has an IP address of 172.16.2.1 and a MAC address of 1a:2b:3c:4d:5e:6f.

The PC 111, the PC 121, and the confidential information management PC 132 are personal computers (PCs). The PC 111 is connected to Net_1, the PC 121 is connected to Net_2, and the confidential information management PC 132 is connected to Net_3.

The confidential server 131 is a server computer. The confidential server 131 is connected to Net_3 and has an IP address of 172.16.3.10.

The MFP 141 is a multifunction peripheral. For example, the MFP 141 has a plurality of functions such as functions of a printer and a scanner. The MFP 141 is connected to Net_MFP, and has an IP address of 192.168.0.10 and a MAC address of aa:bb:cc:dd:ee:ff.

Figure 2:
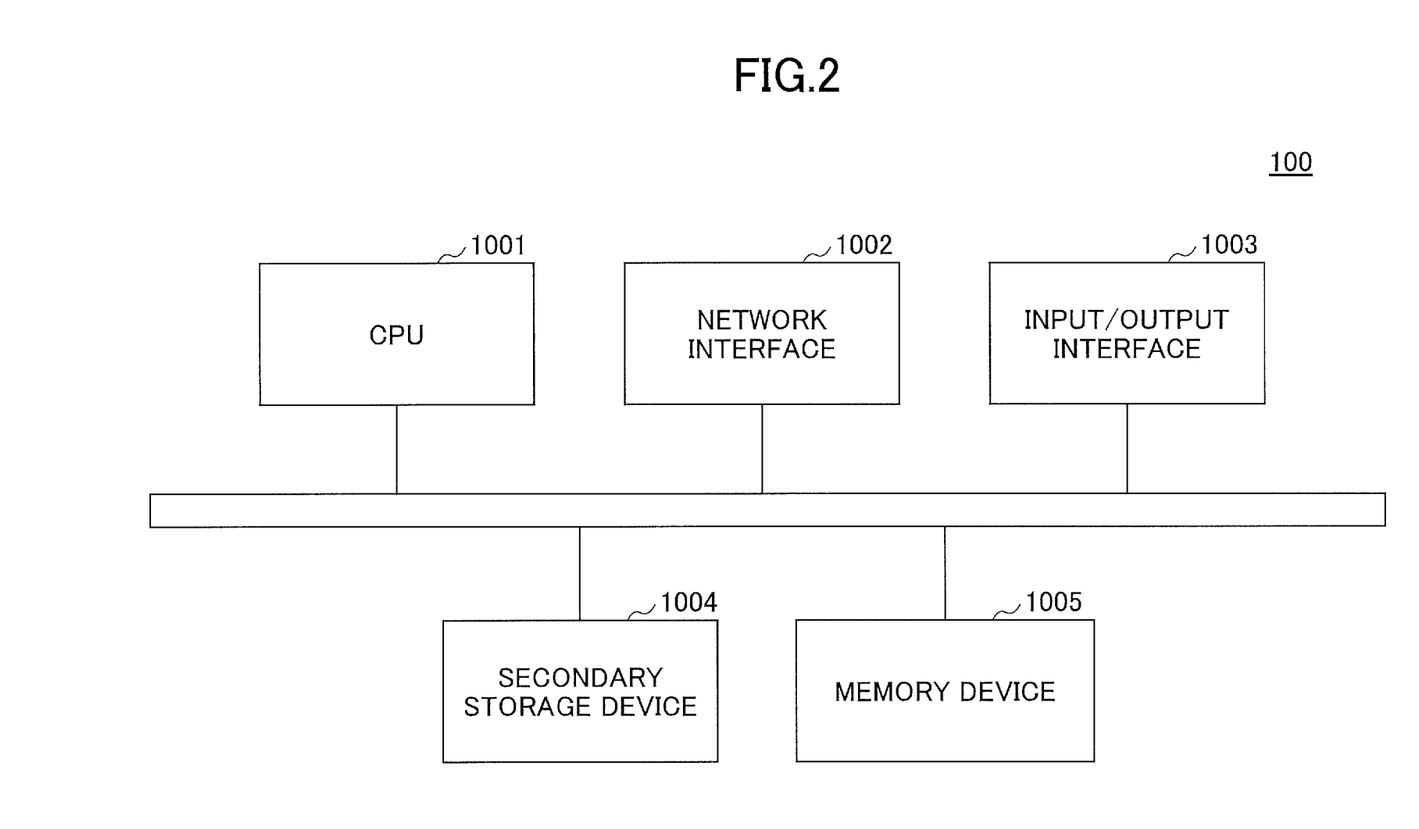
FIG. 2 an example of a hardware block diagram of a relay device according to an embodiment of the present invention.

FIG. 2 an example of a hardware block diagram of the relay device 100 according to an embodiment of the present invention. The relay device 100 of FIG. 2 includes a Central Processing Unit (CPU) 1001, a network interface 1002, an input/output interface 1003, a secondary storage device 1004, and a memory device 1005, etc., which are mutually connected.

The programs for implementing the processes by the relay device 100 are stored in the secondary storage device 1004. The secondary storage device 1004 stores installed programs and necessary files and data, etc.

The memory device 1005 reads out a program from the secondary storage device 1004 and stores the program when an instruction to activate the program is issued. The CPU 1001 implements functions relating to the relay device 100 according to a program stored in the memory device 1005.

The network interface 1002 is an interface for communicating with a device connected to a port. The port may be a wired LAN port or a port using another communication method.

The input/output interface 1003 is an interface for connecting with various input/output devices such as a Universal Serial Bus (USB) device, a hardware key, a status notification Light Emitting Diode (LED), and a liquid crystal display, etc.

Figure 3:
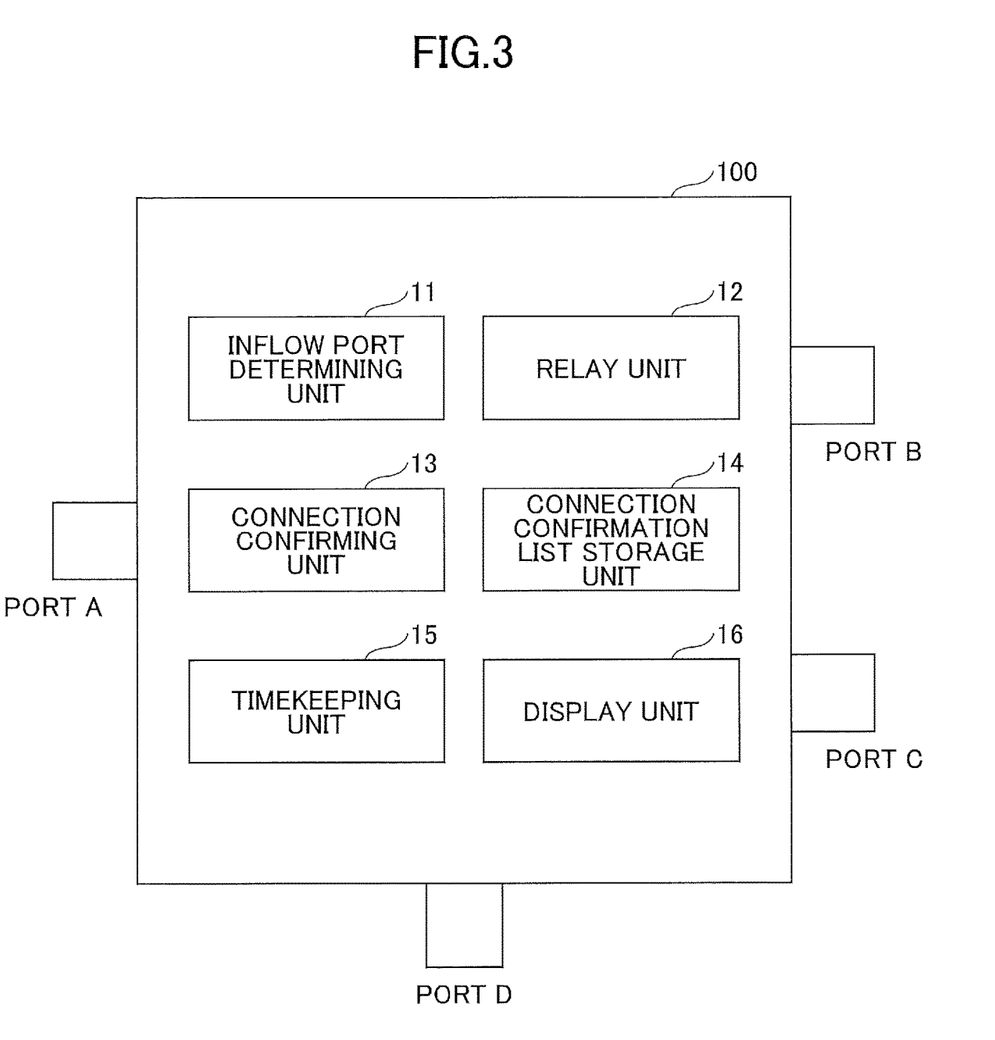
FIG. 3 is an example of a functional block diagram of the relay device according to an embodiment of the present invention.

Note that the GW 110, the GW 120, the PC 111, the PC 121, the confidential information management PC 132, the confidential server 131, and the MFP 141 may have the same hardware configuration as in FIG. 2. FIG. 3 is an example of a functional block diagram of the relay device 100 according to an embodiment of the present invention. As illustrated in FIG. 3, the relay device 100 includes an inflow port determining unit 11, a relay unit 12, a connection confirming unit 13, a connection confirmation list storage unit 14, a timekeeping unit 15, and a display unit 16. These units are implemented by a process that one or more programs installed in the relay device 100 cause the CPU 1001 to execute.

When a packet flows into the relay device 100 via a port, the inflow port determining unit 11 determines the port in which the packet has flowed, among the ports A to D. The relay unit 12 relays communication between the port A and the port B, the port C, or the port D. For example, at the time of activation, the connection confirming unit 13 checks whether the cable connection to the port has been set in advance. Furthermore, the connection confirming unit 13 transmits a response confirmation message to each port, and analyzes a received response message. The connection confirmation list storage unit 14 stores connection confirmation destination information used for the confirmation of connection by the connection confirming unit 13. The timekeeping unit 15 measures a predetermined time. The display unit 16 displays the operation status of the relay unit 12.

Note that each of the devices forming the GW 110, the GW 120, the PC 111, the PC 121, the confidential server 131, the confidential information management PC 132, and the MFP 141 includes at least a responding unit for receiving a response confirmation message transmitted from the relay device 100 and transmitting a response to the relay device 100, and a communication unit for the devices to communicate with each other.

Figure 4:
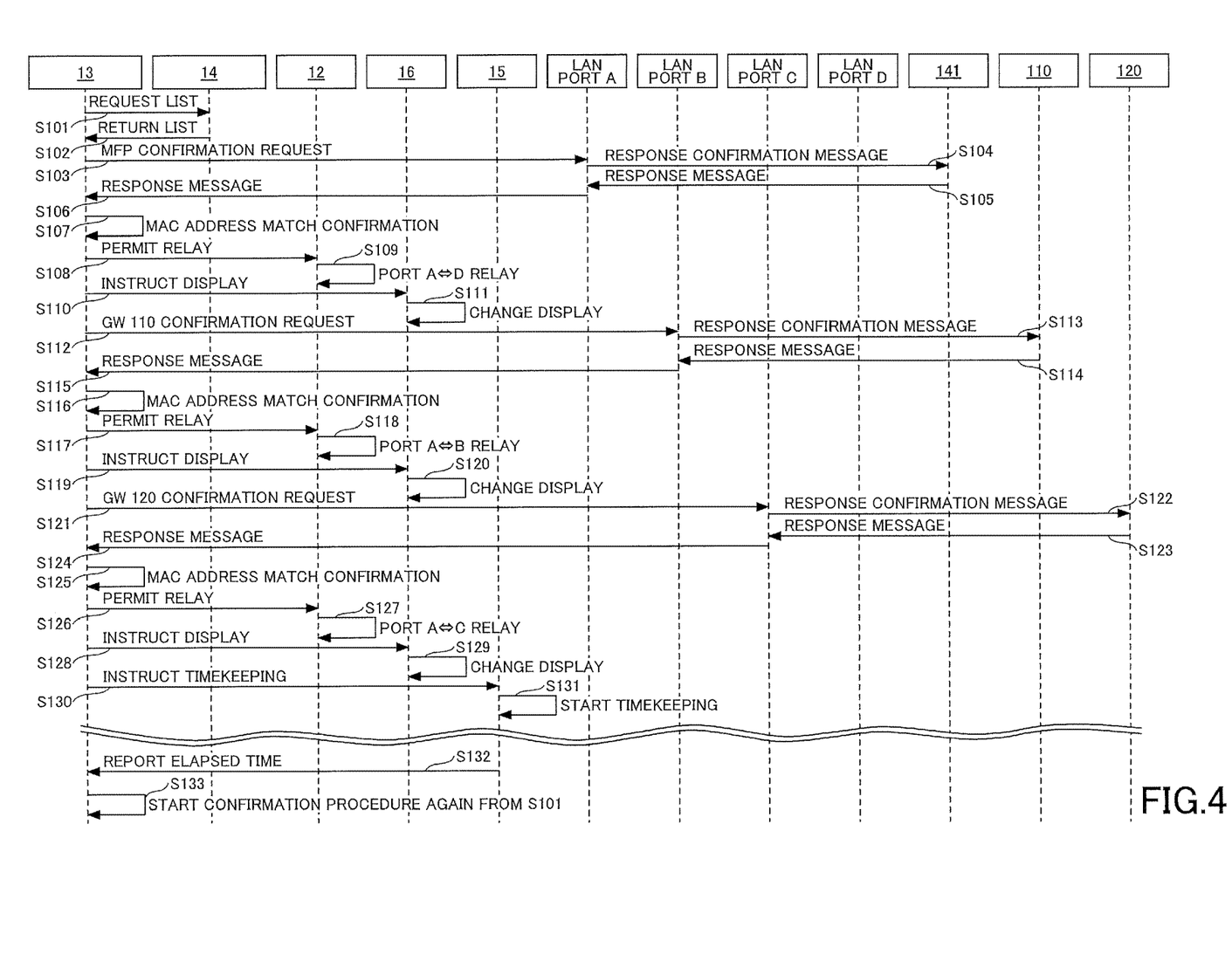
FIG. 4 is a sequence diagram for describing an example of a confirmation procedure executed by the relay device according to an embodiment of the present invention.

FIG. 4 is a sequence diagram for describing an example of a confirmation procedure executed by the relay device 100 according to an embodiment of the present invention. In the sequence illustrated in FIG. 4, the connection confirmation of a device connected to a LAN port is executed based on whether the MAC addresses completely match, and the relay device 100 permits the relay of the communication relating to the corresponding LAN port. FIG. 4 illustrates, for example, a confirmation procedure executed by the relay device 100 at the time of activation; however, the execution of the confirmation procedure is not limited to the time of activation. The confirmation procedure illustrated in FIG. 4 may be executed at any timing.

In step S101, the connection confirming unit 13 transmits a list request to the connection confirmation list storage unit 14. Subsequently, the connection confirmation list storage unit 14 transmits a list response to the connection confirming unit 13 (step S102). Table 1 is an example of the connection confirmation list stored in the connection confirmation list storage unit 14.

TABLE 1

| LAN PORT | LABEL | IP ADDRESS | MAC ADDRESS |
|---|---|---|---|
| LAN PORT A | MFP | 192.168.0.10 (ESSENTIAL) | aa:bb:cc:dd:ee:ff |
| LAN PORT B | GW1 | 172.16.1.1 (OPTIONAL) | uu:vv:ww:xx:yy:zz |
| LAN PORT C | GW2 | 172.16.2.1 (OPTIONAL) | 1a:2b:3c:4d:5e:6f |
| LAN PORT D | — | — (OPTIONAL) | — |

As indicated in Table 1, for each device, "LAN port", "label", "IP address", and "MAC address" are stored in association with each other.

(Essential) or (optional) described in the column "IP address" indicates whether the IP address is essential in the list. For example, for "LAN port A", it is indicated that a device for which "label" is "MFP", "IP address" is "192.168.0.10", and the MAC address is "aa:bb:cc:dd:ee:ff" is a device for which relay of communication by the relay device 100 is permitted. Similarly, for "LAN port B", it is indicated that a device for which "label" is "GW 1", "IP address" is "172.16.1.1", and the MAC address is "uu:vv:ww:xx:yy:zz" is a device for which relay of communication by the relay device 100 is permitted. Similarly, for "LAN port C", it is indicated that a device for which "label" is "GW 2", "IP address" is "172.16.2.1", and the MAC address is "1a:2b:3c:4d:5e:6f" is a device for which relay of communication by the relay device 100 is permitted. Note that for "LAN port D", the descriptions of the label, the IP address, and the MAC address are blank, indicating that a device connected to the LAN port D is a device for which relay of communication by the relay device 100 is permitted in advance.

In step S103, the connection confirming unit 13 transmits an MFP confirmation request to the LAN port A based on the connection confirmation list received in step S102. Subsequently, a response confirmation message is transmitted from the LAN port A to the MFP 141 (step S104). Subsequently, the MFP 141 transmits, via the LAN port A (step S105), a response message to the connection confirming unit 13 (step S106).

In step S107, the connection confirming unit 13 compares the MAC address included in the response message with the MAC address "aa:bb:cc:dd:ee:ff" associated with the label "MFP" for the LAN port A included in the connection confirmation list. When the MAC addresses match, the process proceeds to step S108. Conversely, when the MAC addresses do not match, or when no response message is received, the communication relating to the LAN port A is blocked. At this time, the relay device 100 may abort the sequence illustrated in FIG. 4.

In step S108, the connection confirming unit 13 transmits a relay permission to the relay unit 12. Subsequently, the relay unit 12 enables the communication between the LAN port A and the LAN port D (step S109). In step S110, the connection confirming unit 13 transmits a display instruction to the display unit 16. Subsequently, the display unit 16 changes the display (step S111).

Figure 5A:
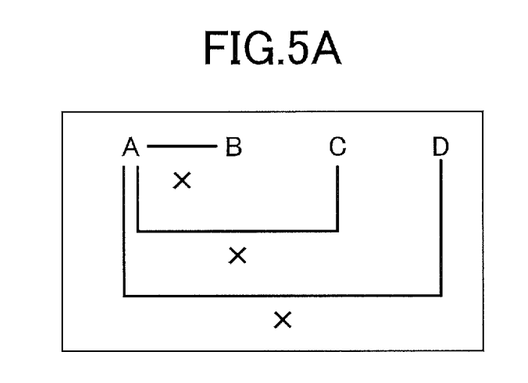
FIGS. 5A through 5D are diagrams illustrating display examples of a display unit according to an embodiment of the present invention.

FIGS. 5A through 5D are diagrams illustrating display examples of the display unit 16 according to an embodiment of the present invention. A display example 1 illustrated in FIG. 5A is an example where a state in which relaying is not performed is displayed on the display unit 16. Table 2 is a table indicating the state of display example 1 illustrated in FIG. 5A.

TABLE 2

| RELAY LAN PORT | RELAY STATE |
|---|---|
| BETWEEN LAN PORT A AND LAN PORT B | x |
| BETWEEN LAN PORT A AND LAN PORT C | x |
| BETWEEN LAN PORT A AND LAN PORT D | x |

As indicated in Table 2, communication between LAN port A and LAN port B, communication between LAN port A and LAN port C, and communication between LAN port A and LAN port D are not relayed. The state indicated in Table 2 is, for example, the initial state of the relay device 100. That is, at the time of step S101 illustrated in FIG. 4, the display unit 16 may display the display example 1 illustrated in FIG. 1. Furthermore, the state indicated in Table 2 is, for example, a state in which the connection confirming unit 13 could not confirm a response message from the MFP 141.

Figure 5B:
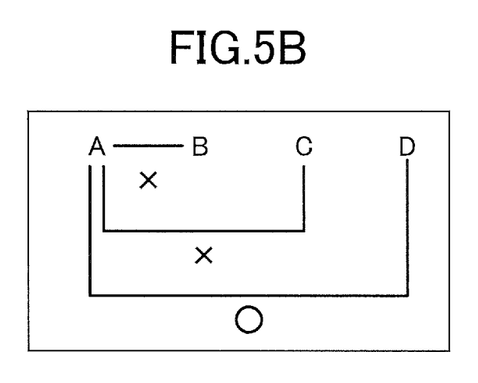

Table 3 is a table indicating a state of a display example 2 illustrated in FIG. 5B.

TABLE 3

| RELAY LAN PORT | RELAY STATE |
|---|---|
| BETWEEN LAN PORT A AND LAN PORT B | x |
| BETWEEN LAN PORT A AND LAN PORT C | x |
| BETWEEN LAN PORT A AND LAN PORT D | o |

The display example 2 illustrated in FIG. 5B is an example where a state in which only the communication between the LAN port A and the LAN port D is relayed, is displayed on the display unit 16. That is, as indicated in Table 3, communication between the LAN port A and the LAN port B and communication between the LAN port A and the LAN port C are not relayed, but communication between the LAN port A and the LAN port D is relayed. In the state indicated in Table 3, for example, the connection confirming unit 13 has confirmed a response message from the MFP 141.

Figure 5C:
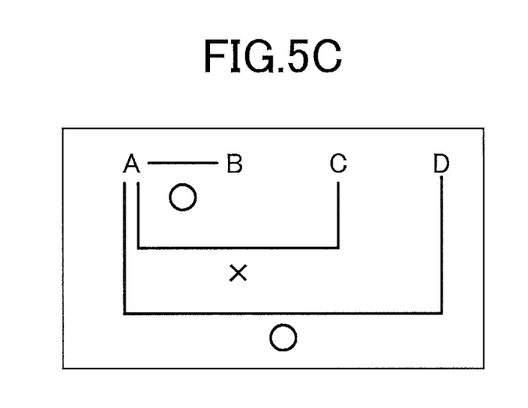

Table 4 is a table indicating the state of a display example 3 illustrated in FIG. 5C.

TABLE 4

| RELAY LAN PORT | RELAY STATE |
|---|---|
| BETWEEN LAN PORT A AND LAN PORT B | o |
| BETWEEN LAN PORT A AND LAN PORT C | x |
| BETWEEN LAN PORT A AND LAN PORT D | o |

The display example 3 illustrated in FIG. 5C is an example where a state in which communication between the LAN port A and the LAN port B and communication between the LAN port A and the LAN port D are relayed, is displayed on the display unit 16. That is, as indicated in Table 4, communication between the LAN port A and the LAN port C is not relayed, but communication between the LAN port A and the LAN port B and communication between the LAN port A and the LAN port D are relayed. In the state indicated shown in Table 4, for example, the connection confirming unit 13 has confirmed a response message from the MFP 141 and the GW 110.

Figure 5D:
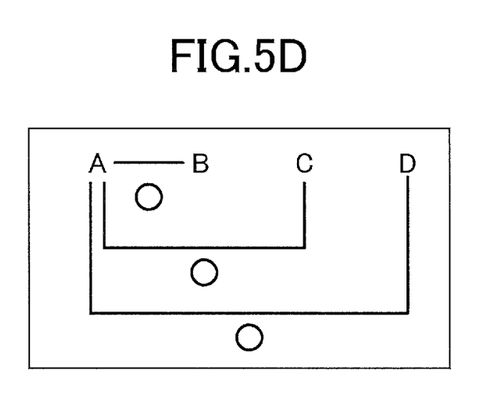

Table 5 is a table indicating the state of a display example 4 illustrated in FIG. 5D.

TABLE 5

| RELAY LAN PORT | RELAY STATE |
|---|---|
| BETWEEN LAN PORT A AND LAN PORT B | ◯ |
| BETWEEN LAN PORT A AND LAN PORT C | ◯ |
| BETWEEN LAN PORT A AND LAN PORT D | ◯ |

A display example 4 illustrated in FIG. 5D is an example where a state in which communication between the LAN port A and the LAN port B, communication between the LAN port A and the LAN port C, and communication between the LAN port A and the LAN port D is relayed, are displayed on the display unit 16. That is, as indicated in Table 5, communication between the LAN port A and the LAN port B, communication between the LAN port A and the LAN port C, and communication between the LAN port A and the LAN port D are relayed. In the state indicated in Table 5, for example, the connection confirming unit 13 has confirmed a response message from the MFP 141, the GW 110, and the GW 120.

Referring back to FIG. 4, in step S111, the display unit 16 changes the display from the display example 1 to the display example 2 illustrated in FIG. 5B. That is, the display unit 16 displays a state in which communication between the LAN port A and the LAN port D is relayed.

In step S112, the connection confirming unit 13 transmits a GW 110 confirmation request to the LAN port B based on the connection confirmation list received in step S102. Subsequently, a response confirmation message is transmitted from the LAN port B to the GW 110 (step S113). Subsequently, the GW 110 transmits, via the LAN port B (step S114), a response message to the connection confirming unit 13 (step S115).

In step S116, the connection confirming unit 13 compares the MAC address included in the response message with the MAC address "uu:vv:ww:xx:yy:zz" associated with the label "GW 1" for the LAN port B included in the connection confirmation list. When the MAC addresses match, the connection confirming unit 13 determines that the connection confirmation has been successful, and proceeds to step S117. Conversely, when the MAC addresses do not match, or when a response message is not received, the connection confirming unit 13 determines that the connection confirmation has been unsuccessful and blocks the communication relating to the LAN port B. At this time, the relay device 100 may abort the sequence illustrated in FIG. 4.

In step S117, the connection confirming unit 13 transmits a relay permission to the relay unit 12. Subsequently, the relay unit 12 enables the communication between the LAN port A and the LAN port B (step S118). In step S119, the connection confirming unit 13 transmits a display instruction to the display unit 16. Subsequently, the display unit 16 changes the display from the display example 2 to the display example 3 illustrated in FIG. 5C (step S120). That is, the display unit 16 displays a state in which communication between the LAN port A and the LAN port B and communication between the LAN port A and the LAN port D are relayed.

In step S121, the connection confirming unit 13 transmits a GW 120 confirmation request to the LAN port B based on the connection confirmation list received in step S102. Subsequently, a response confirmation message is transmitted from the LAN port C to the GW 120 (step S122). Subsequently, the GW 120 transmits, via the LAN port C (step S123), a response message to the connection confirming unit 13 (step S124).

In step S125, the connection confirming unit 13 compares the MAC address included in the response message with the MAC address "1a:2b:3c:4d:5e:6f" associated with the label "GW 2" for the LAN port C included in the connection confirmation list. When the MAC addresses match, the connection confirming unit 13 determines that the connection confirmation has been successful, and proceeds to step S126. Conversely, when the MAC addresses do not match, or when a response message is not received, the connection confirming unit 13 determines that the connection confirmation has been unsuccessful and blocks the communication relating to the LAN port C. At this time, the relay device 100 may abort the sequence illustrated in FIG. 4.

In step S126, the connection confirming unit 13 transmits a relay permission to the relay unit 12. Subsequently, the relay unit 12 enables communication between the LAN port A and the LAN port C (step S127). In step S128, the connection confirming unit 13 transmits a display instruction to the display unit 16. Subsequently, the display unit 16 changes the display from the display example 3 to the display example 4 illustrated in FIG. 5D (step S129). That is, the display unit 16 displays a state in which communication between the LAN port A and the LAN port B, communication between the LAN port A and the LAN port C, and communication between the LAN port A and the LAN port D are relayed.

In step S130, the connection confirming unit 13 transmits a timekeeping instruction to the timekeeping unit 15. Subsequently, the timekeeping unit 15 starts timekeeping (step S131). Upon the elapse of a predetermined time after starting the timekeeping, a time elapse report is transmitted to the connection confirming unit 13 (step S132).

In step S133, the connection confirming unit 13 proceeds to step S101 in order to start the confirmation procedure again. That is, when a predetermined time has elapsed after the execution of the confirmation procedure, the confirmation procedure is executed again. Furthermore, the confirmation procedure may be repeated at regular time intervals. By the above steps, the confirmation procedure executed by the relay device 100 is completed.

Note that in the sequence illustrated in FIG. 4, the connection confirming unit 13 executes the connection confirmation of a device connected to a LAN port based on the complete matching of the MAC addresses. However, the connection confirming method is not limited to the complete matching of MAC addresses. For example, the connection confirmation method indicated in Table 6 may be used.

TABLE 6

| METHOD OF CONFIRMING CONNECTION | RESPONSE CONFIRMATION MESSAGE | RESPONSE MESSAGE | DETERMINATION BY CONNECTION CONFIRMING UNIT 13 |
|---|---|---|---|
| ping RESPONSE CONFIRMATION | ICMP ECHO REQUEST | ICMP ECHO RESPONSE | WHETHER ECHO RESPONSE IS NORMAL |

TABLE 6-continued

| METHOD OF CONFIRMING CONNECTION | RESPONSE CONFIRMATION MESSAGE | RESPONSE MESSAGE | DETERMINATION BY CONNECTION CONFIRMING UNIT 13 |
|---|---|---|---|
| MAC ADDRESS VENDOR PART MATCHING | arp request | arp reply | WHETHER LEADING THREE BYTES ARE OF A PARTICULAR VENDOR |
| MAC ADDRESS COMPLETE MATCHING | arp request | arp reply | WHETHER MAC ADDRESS COMPLETELY MATCHES ADDRESS SET IN ADVANCE IN TABLE 1 |
| ACQUIRE EXTENDED MIB | SNMP Get-Request | SNMP Get-Response | WHETHER THERE IS OID OF PARTICULAR VENDOR |
| PORT SCANNING | CONNECTION REQUEST | CONNECTION RESPONSE (PERMIT/REJECT) | WHETHER A PARTICULAR PORT IS OPEN |

As indicated in Table 6, when the connection confirmation method is "ping response confirmation", "ICMP echo request" is used as the response confirmation message and "ICMP echo response" is used as the response message. The connection confirming unit 13 determines whether the echo response is normal.

As indicated in Table 6, when the connection confirmation method is "MAC address vendor part match", "arp request" is used as the response confirmation message and "arp reply" is used as the response message. The connection confirming unit 13 determines whether the leading three bytes of the MAC address included in arp reply are of a particular vendor. That is, the relay device 100 can permit relaying with respect to a device of a particular vendor.

As indicated in Table 6, when the connection confirmation method is "MAC address complete matching", "acp request" is used as the response confirmation message and "arp reply" is used as the response message. The connection confirming unit 13 determines whether the MAC address completely matches the MAC address set in advance in the connection confirmation list indicated in Table 1.

As indicated in Table 6, when the connection confirmation method is "acquire extended MIB", "Simple Network Management Protocol (SNMP) Get-Request" is used as the response confirmation message and "SNMP Get-response" is used as the response message. The connection confirming unit 13 determines whether an Object Identifier (OID) of a particular vender exists among the OIDs included in the SNMP Get-Response. That is, the relay device 100 can permit relaying with respect to a device of a particular vendor. Furthermore, the OID is setting information set in the device in advance, and the possibility of a change in the OID is relatively low compared to a MAC address.

As indicated in Table 6, when the connection confirmation method is "port scanning", "connection request" is used as the response confirmation message, and "connection response (permit/reject)" is used as the response message. The connection confirming unit 13 determines whether a particular port is open. The "connection request" may be a Transmission Control Protocol (TCP) packet or a User Datagram Protocol (UDP) packet.

As described above, according to an embodiment of the present invention, the relay device 100 confirms the connection of each of the devices connected to a plurality of networks, based on the connection confirmation list registered in advance, and then permits the relaying of the network. Therefore, when an unintended physical connection is made, relaying of the network is not permitted. Therefore, when a plurality of networks are separated, it is possible to prevent communication in a combination of networks for which communication is not permitted.

In the embodiment of the present invention, the network Net_MFP is an example of a first network. The network Net_1, the network Net_2, or the network Net_3 is an example of a second network. The relay device 100 is an example of a communication device. The connection confirming unit 13 is an example of a confirming unit. The connection confirmation list is an example of a device list. An IP address is an example of a logical address. The ping response is an example of an echo response. The MAC address is an example of a physical address. The leading three bytes of the MAC address indicating the vendor of the device are an example of a part of the physical address. SNMP is an example of a network management protocol. The OID is an example of an identifier on the network management protocol. The MFP 141 is an example of an image processing device. The PC 111 is an example of an information processing device.

According to one embodiment of the present invention, it is possible to prevent communication in a combination of networks for which communication is not permitted, when a plurality of networks are separated.

The communication device, the communication method, and the communication system are not limited to the specific embodiments described in the detailed description, and variations and modifications may be made without departing from the spirit and scope of the present invention.

What is claimed is:

1. A communication device connected to a first network and a second network, the communication device comprising a first communication port for physically connecting with a first device on the first network through a first local area network cable, and a second communication port for physically connecting with a second device on the second network through a second local area network cable, said first network having a first network address, and the second network having a second network address that is different from the first network address, and a processor, in communication with a memory, executing a process including:

storing, within the communication device, connection confirmation information including identification information of the first device for permitting the first device to connect via the first communication port and identification information of the second device for permitting the second device to connect via the second communication port; and preempting a relay between the first network via the first communication port and the second network via the second communication port upon detecting that the identification information of the first device is not received from the first communication port and that the identification information of the second device is not received from the second communication port based on the connection confirmation information.

2. The communication device according to claim 1, wherein the process further includes:
enabling the relay between the first network via the first communication port and the second network via the second communication port upon detecting the identification information of the first device from the first communication port and the identification information of the second device from the second communication port based on the connection confirmation information.

3. The Communication device according to claim 1, wherein the preempting is performed by preempting transmission and reception of packets with the first device through the first communication port, and transmission and reception of packets with the second device through the second communication port, and wherein the enabling is performed by permitting the transmission and reception of the packet with the first device through the first communication port and transmission and reception of the packet with the second device through the second communication port.

4. The communication device according to claim 1, wherein the processor executes the process further including:
displaying, on a display, a state of the relaying being enabled or a state of the relaying being preempted.

5. The communication device according to claim 1, wherein the confirming includes confirming again the connection to the first device connected to the first network and the connection to the second device connected to the second network, upon determining that a predetermined time has elapsed from a time point when the relaying has been enabled or preempted.

6. The communication device according to claim 1, wherein the first communication port and the second communication port are ports for physically connecting the first device and the second device by wire.

7. The communication device according to claim 1, wherein the communication device physically comprises a plurality of second communication ports.

8. The communication device according to claim 1, wherein the connection confirmation information includes at least an IP address.

9. A communication method executed by a computer included in communication device connected to a first network and a second network, said communication device including a first communication port for physically connecting with a first device on the first network through a first local area network cable, and a second communication port for physically connecting with a second device on the second network through a second local area network cable, said first network having a first network address, and the second network having a second network address that is different from the first network address, the communication method comprising:
storing, within the communication device, connection confirmation information including identification information of the first device on the first network for permitting the first device to connect via the first communication port and identification information of the second device on the second network for permitting the second device to connect via the second communication port; and
preempting a relay between the first network via the first communication port and the second network via the second communication port upon detecting that the identification information of the first device is not received from the first communication port and that the identification information of the second device is not received from the second communication port based on the connection confirmation information.

10. A communication system comprising:
a communication device connected to a first network and a second network;
an image processing device connected to the first network; and
an information processing device connected to the second network, said first network having a first network address, and the second network having a second network address that is different from the first network address.
wherein the image processing device includes a first processor, in communication with a first memory, executing a first process including:
responding to a connection confirmation transmitted from the communication device; and
communicating with the information processing device, wherein information processing device includes a second processor, in communication with a second memory, executing a second process including:
responding to a connection confirmation transmitted from the communication device; and
communicating with the image processing device, and
wherein the communication device includes a first communication port for physically connecting with the image processing device on the first network through a first local area network cable, a second communication port for physically connecting with the information processing device on the second network through a second local area network cable, and a third processor, in communication with a third memory, executing a third process including:
storing, within the communication device, connection confirmation information including identification information of the image processing device for permitting the image processing device to connect via the first communication port and identification information of the information processing device for permitting the information processing device to connect via the second communication port; and
preempting a relay between the first network via the first communication port and the second network via the second communication port upon detecting that the identification information of the image processing device is not received from the first communication port and that the identification information of the information processing device is not received from the second communication port based on the connection confirmation information.

* * * * *